United States Patent [19]
Dougherty et al.

[11] Patent Number: 6,059,378
[45] Date of Patent: May 9, 2000

[54] TAPERLOCK AXLE APPARATUS AND FLANGE

[75] Inventors: Michael C. Dougherty, Navarre, Ohio; Terry M. McInerney; Robert J. Stevens, both of Columbus, Ind.

[73] Assignee: Impact Forge, Inc., Columbus, Ind.

[21] Appl. No.: 08/846,859

[22] Filed: May 1, 1997

[51] Int. Cl.[7] .................................................. B60B 35/00
[52] U.S. Cl. .................... 301/124.1; 301/126; 301/132
[58] Field of Search .................................. 301/105.1, 111, 301/114, 122, 126, 131, 132, 124.1; 188/218 XL; 403/359; 29/525, 515, 516, 522.1

[56] References Cited

U.S. PATENT DOCUMENTS

| | | |
|---|---|---|
| 310,846 | 1/1885 | Owen et al. . |
| 361,952 | 4/1887 | Little . |
| 418,198 | 12/1889 | Lemp et al. . |
| 1,401,582 | 12/1921 | Brush et al. ............................. 301/126 |
| 1,426,009 | 8/1922 | Rantsch ................................ 301/105.1 |
| 1,487,624 | 3/1924 | Tollefson et al. ........................ 301/111 |
| 1,861,640 | 6/1932 | McCabe .................................. 403/359 |
| 2,259,460 | 10/1941 | Dexter .................................... 403/359 |
| 2,490,594 | 12/1949 | Madden .................................. 411/180 |
| 2,495,503 | 1/1950 | Beatrice ................................... 403/359 |
| 2,535,403 | 12/1950 | Froggatt . |
| 2,539,387 | 1/1951 | Alden ..................................... 301/126 |
| 2,544,304 | 3/1951 | Eckenbeck et al. ...................... 29/505 |
| 2,667,047 | 1/1954 | Mennear ................................. 301/126 |
| 2,940,781 | 6/1960 | Erickson ................................. 301/111 |
| 2,958,758 | 11/1960 | Snell . |
| 3,005,259 | 10/1961 | Benya et al. ............................. 29/512 |
| 3,283,402 | 11/1966 | Larson ................................... 411/180 |
| 3,418,012 | 12/1968 | Torre .................................... 403/408.1 |

(List continued on next page.)

FOREIGN PATENT DOCUMENTS

| | | | |
|---|---|---|---|
| 82058 | 2/1957 | Denmark ............................ 301/105.1 |
| 693691 | 11/1930 | France ............................... 301/110.5 |
| 731110 | 12/1942 | Germany ............................... 301/111 |
| 4219213 | 12/1993 | Germany ............................ 301/105.1 |
| 4338380 | 5/1994 | Germany ............................ 301/105.1 |
| 546563 | 7/1942 | United Kingdom ................ 301/105.1 |

Primary Examiner—S. Joseph Morano
Assistant Examiner—Long Bao Nguyen
Attorney, Agent, or Firm—Harness, Dickey & Pierce, P.L.C.

[57] ABSTRACT

A flange and shaft for a two-piece forged axle and method for forging same. The flange includes a hub formed concentric about a longitudinal axis wherein the hub defines an inner annular face, an outer annular face, and a bore extending therebetween. The bore includes a first tapered surface diverging from the longitudinal axis. The flange further includes an annular ring coaxial and integral with the hub as well as a locking arrangement integral with the tapered surface for mechanically coupling the flange for rotation with a shaft. Additional embodiments of the present invention include a two-piece axle having a flange generally configured as described above and a cylindrical shaft disposed in the bore of the flange. The shaft includes a first end portion having a first radial upset engaging a first locking arrangement on the flange to couple the flange for rotation with the shaft. Finally, a method for coupling a flange for rotation with a shaft is disclosed to include the steps of placing a shaft formed of a first material within a bore defined by a flange formed of a second material and upsetting the shaft such that the first material is radially displaced to engage a locking arrangement formed in the flange. More particularly, the flange includes a longitudinal axis, an outer annular face, an inner annular face, and a taper portion diverging from the longitudinal axis. The flange further includes the locking arrangement integral with the taper portion for mechanically coupling the flange for rotation with the shaft.

26 Claims, 9 Drawing Sheets

U.S. PATENT DOCUMENTS

| | | | |
|---|---|---|---|
| 3,562,893 | 2/1971 | Winslow et al. | |
| 3,608,685 | 9/1971 | Childress | 403/359 |
| 4,076,356 | 2/1978 | Tamburro | 439/426 |
| 4,118,134 | 10/1978 | Mansel | 403/359 |
| 4,135,766 | 1/1979 | Trautloff | 301/114 |
| 4,208,776 | 6/1980 | Schleicher | |
| 4,210,372 | 7/1980 | McGee et al. | 403/359 |
| 4,408,786 | 10/1983 | Stuemky | 29/516 |
| 4,437,536 | 3/1984 | Colanzi et al. | 301/126 |
| 4,472,869 | 9/1984 | Yasui et al. | 29/525 |
| 4,588,322 | 5/1986 | Shoemaker et al. | 403/359 |
| 4,768,839 | 9/1988 | Spindler | |
| 4,835,832 | 6/1989 | Arnold et al. | |
| 4,886,392 | 12/1989 | Lio | 29/525 |
| 4,924,584 | 5/1990 | Harney | |
| 5,433,306 | 7/1995 | Yang | 301/105.1 |
| 5,536,098 | 7/1996 | Schwarzler | 301/105.1 |

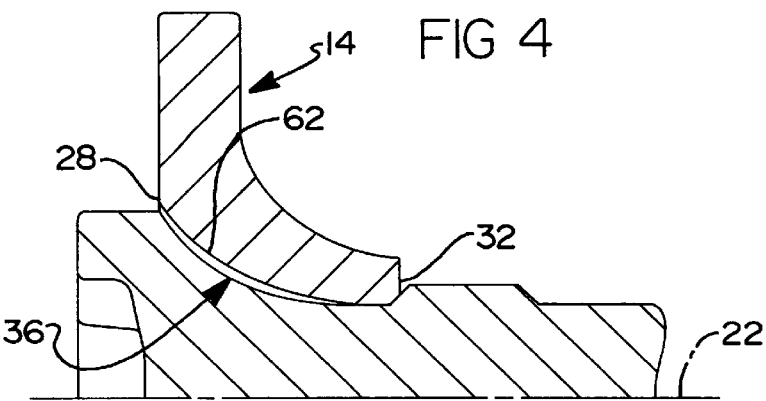
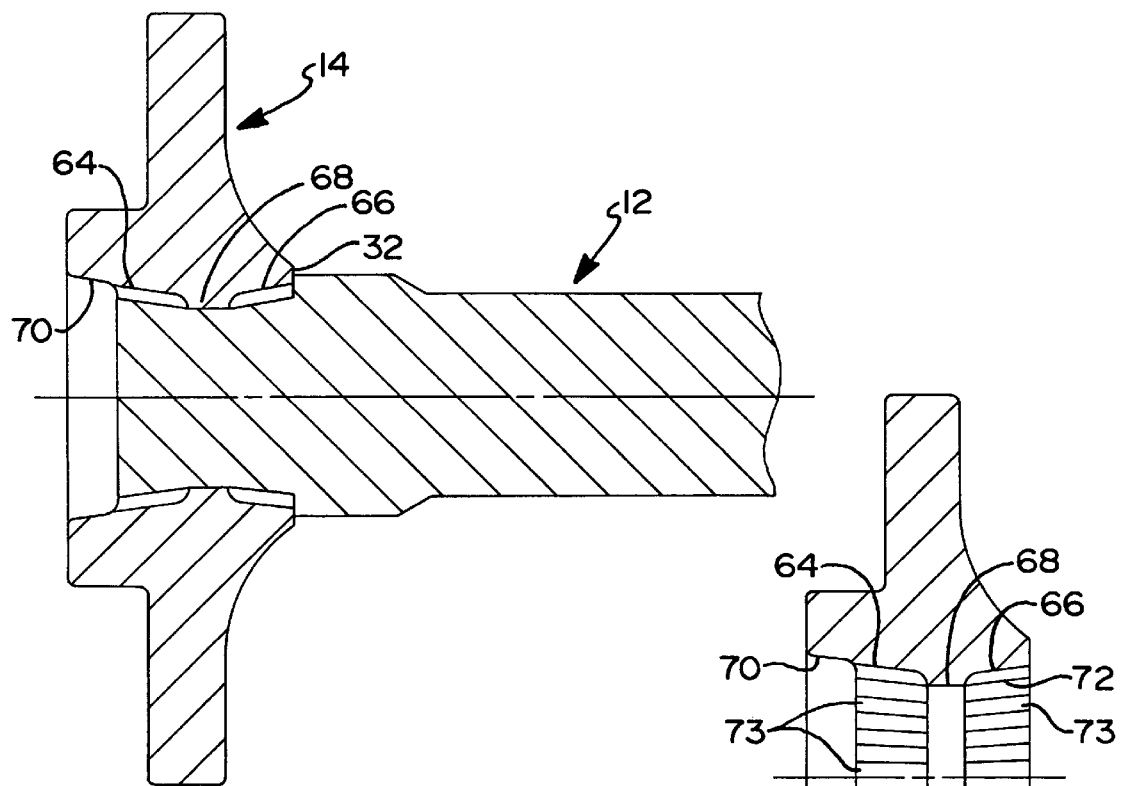
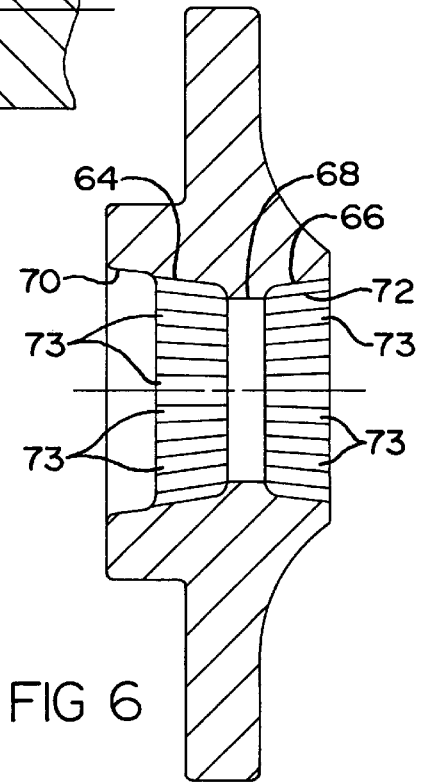

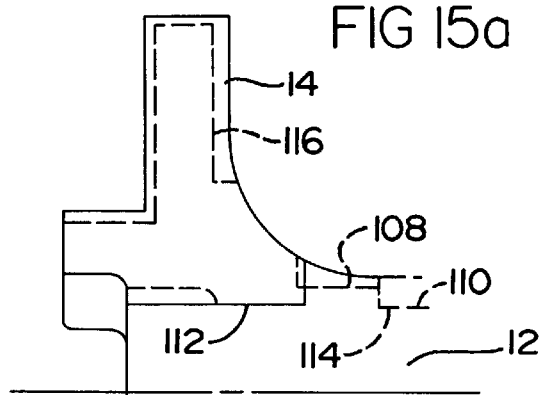
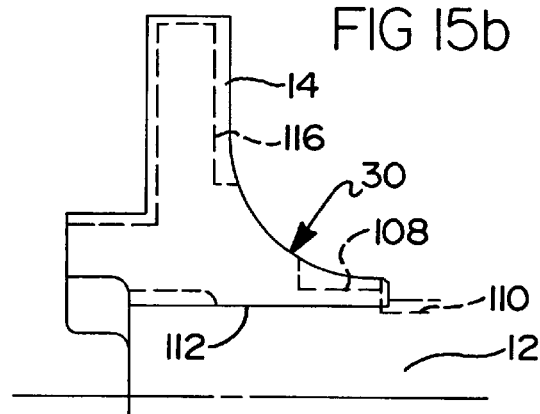
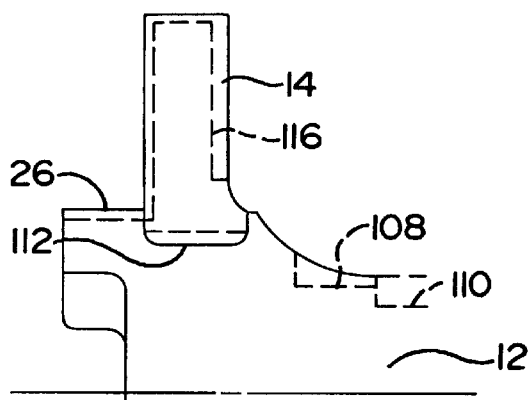

TAPERLOCK AXLE APPARATUS AND FLANGE

BACKGROUND OF THE INVENTION

1. Technical Field

The present invention relates to an axle and, more particularly, to a two piece forged axle for use as axle shafts for vehicles.

2. Discussion

Axles generally include a one-piece flange and a shaft section wherein the shaft section has a first end integral with the flange and a second free end having a reduced diameter. In operation, a pair of axles are mechanically coupled for rotation with or relative to one another in a manner known in the art. The current method of producing axles involves hot forging a single piece of stock on equipment commonly known as an upsetter to form a flange section on one end of the stock. The flange section diameter and thickness are limited by the upsetter operation and the starting barstock size necessary to gather this volume in the number of blows the machine can perform on the part. These concerns force the selection of an initial diameter that is significantly larger than the smaller design diameters on the free end of the final shaft section. As a result, the hot forging of the flange section is followed by an expensive process of cold extrusion during which the diameter of the shaft is reduced in a step-wise fashion. Cold extrusion requires the application of a cold extrusion lubricant, usually an expensive phosphate and soap process. Beyond the expenses associated with the multiple step cold extrusion, another drawback of the current axle forming technique includes the mismatch and flashline produced along the sides of the flange from the split die design of upsetters.

The present invention separates the shaft section from the flange section of the axle component to allow for more optimum and independent design and processing of each section. The flange section is produced on vertical forging equipment with more optimized upset ratios, greater design flexibility, and tighter tolerances than are possible on an upsetter. The shaft section, depending on the customer's final design, can vary from a straight piece of barstock to a complex geometry not possible with the current hot upset/cold extrusion process. A further advantage provided by the present invention is that different materials may be selected for the shaft and flange sections whereupon the two parts are forged together into a single axle component. More particularly, the flange is produced with a single or double taper of either straight or compound design that includes a positive mechanical drive interlock such as a spline on its inner diameter. The independently designed shaft section is then inserted into a bore in the flange and the shaft is coupled to the flange by cold, warm, or hot forging.

SUMMARY OF THE INVENTION

Accordingly, the present invention overcomes the manufacturing process disadvantages associated with a single piece forged and extruded axle by providing a two-piece axle assembly that includes a flange mechanically coupled to the shaft thereby allowing the flange and shaft components to be separately manufactured with higher precision, greater flexibility of material choice, and a reduction in manufacturing costs.

In a preferred embodiment of the present invention, the axle flange includes a hub formed concentric about a longitudinal axis wherein the hub defines an inner annular face, an outer annular face, and a bore extending therebetween. The bore includes a first tapered surface diverging from the longitudinal axis. The flange further includes an annular ring coaxial and integral with the hub as well as a locking arrangement integral with the tapered surface for mechanically coupling the flange for rotation with a shaft. Additional embodiments of the present invention include a two-piece axle having a flange generally configured as described above and a cylindrical shaft disposed in the bore of the flange. The shaft includes a first end portion having a first radial upset engaging a first locking arrangement on the flange to couple the flange for rotation with the shaft. Finally, a method for coupling a flange for rotation with a shaft is disclosed to include the steps of placing a shaft formed of a first material within a bore defined by a flange formed of the same or a second material and upsetting the shaft such that the first material is radially displaced to engage a locking arrangement formed in the flange. More particularly, the flange includes a longitudinal axis, an outer annular face, an inner annular face, and a taper portion diverging from the longitudinal axis. The flange further includes the locking arrangement integral with the taper portion for mechanically coupling the flange for rotation with the shaft.

BRIEF DESCRIPTION OF THE DRAWINGS

FIG. 4 is a partial cross sectional view similar to that shown in FIG. 2 illustrating a single taper mechanical interlock with a compound curvature taper;

FIG. 5 is a cross sectional view similar to that shown in FIG. 2 illustrating a flange having a double opposed taper mechanical interlock;

FIG. 6 is a cross sectional view showing the flange of FIG. 5 with the shaft removed to more clearly illustrate the double opposed taper mechanical interlock arrangement;

FIG. 15a illustrates an axle configuration having the seal and bearing diameters on the shaft section and the wheel hub on the flange section;

FIG. 15b illustrates an axle configuration having the bearing diameter on the shaft section and the seal diameter and wheel hub on the flange section; and FIG. 15c illustrates an axle configuration having the seal and bearing diameters as well as the wheel hub on the shaft section.

DETAILED DESCRIPTION OF THE PREFERRED EMBODIMENT

While the following description and drawings illustrate the present invention for use with a wheeled axle, those skilled in the art will appreciate that the forged apparatus and forging techniques described and claimed herein are applicable in a variety of metal working environments. Accordingly, the following description of the embodiments of the present invention are merely exemplary in nature and are not intended to unduly limit the scope of the claimed invention.

Figure 1:
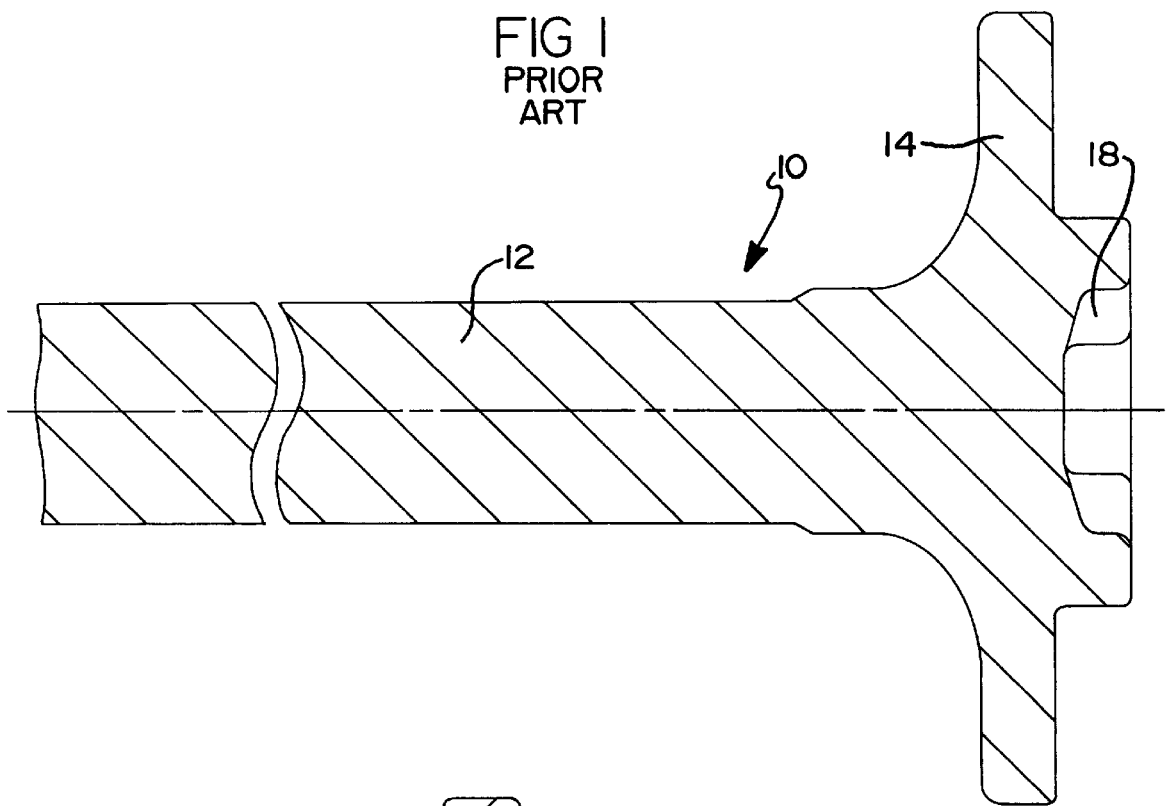
FIG. 1 is a cross sectional view of a forged axle according to the existing forging process.
Figure 2:
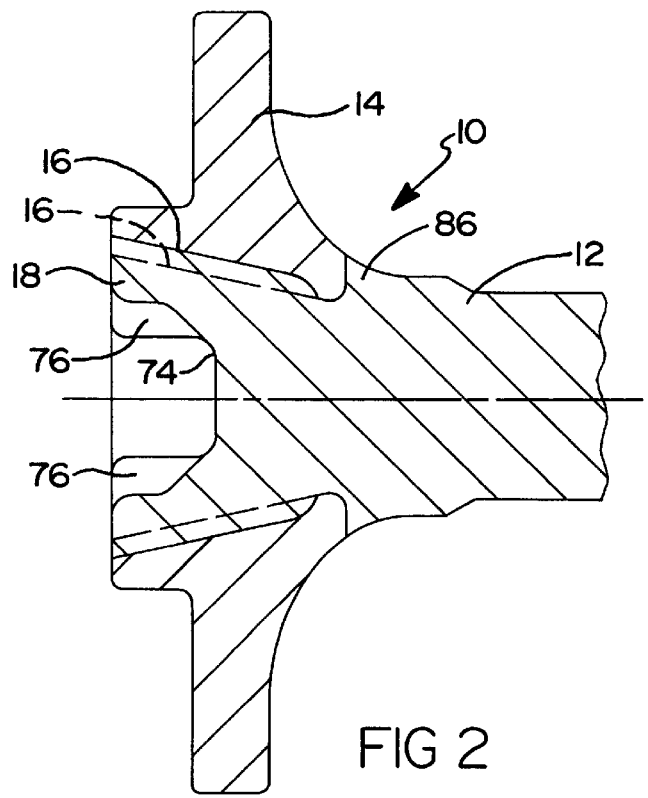
FIG. 2 is a cross sectional view of the present invention taken along the longitudinal center line of the axle and illustrating a single taper mechanical interlock between the axle shaft and flange.

An axle 10 is shown in FIG. 2 to include a shaft 12 forged to a flange 14 thereby creating a forging interface 16 circumscribing shaft 12 proximate to a first shaft end 18. As described in detail hereinafter, shaft 12 may be cold, warm, or hot forged to flange 14 such that the shaft 12 and flange 14 are mechanically interlocked for rotation as a single unit. Accordingly, a significant advantage provided by the present invention is that the shaft and flange may be separately designed and manufactured to accommodate particular operational concerns of the axle. Specifically, if desired, shaft 12 and flange 14 may be manufactured from dissimilar materials such as, for example, a C1070 steel shaft and a C1040 steel flange.

Figure 3A:
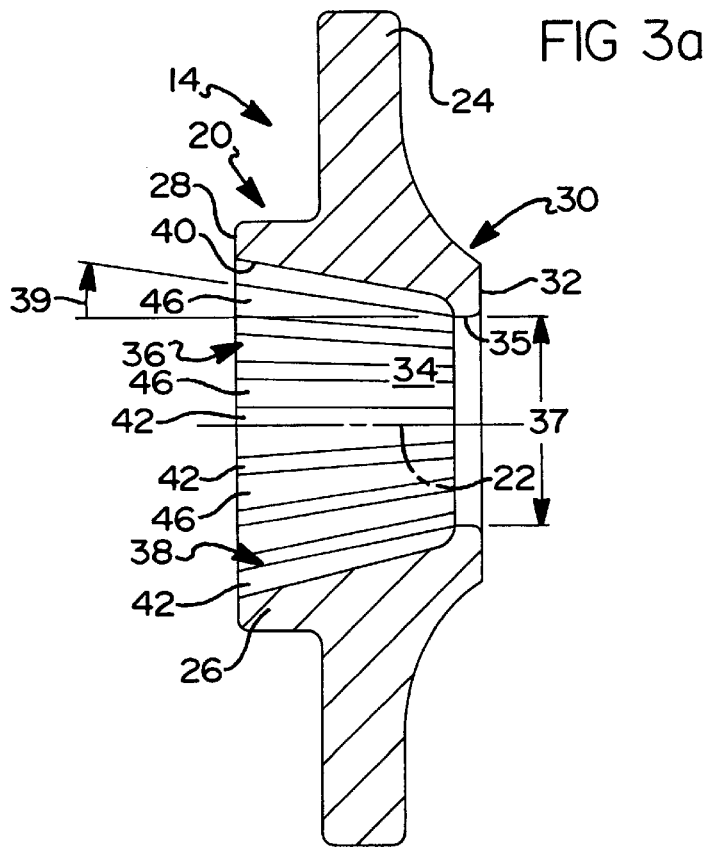
FIG. 3a is a cross sectional view of the flange shown in FIG. 2 with the shaft removed to more clearly illustrate the single taper mechanical interlock flange configuration.
Figure 3B:
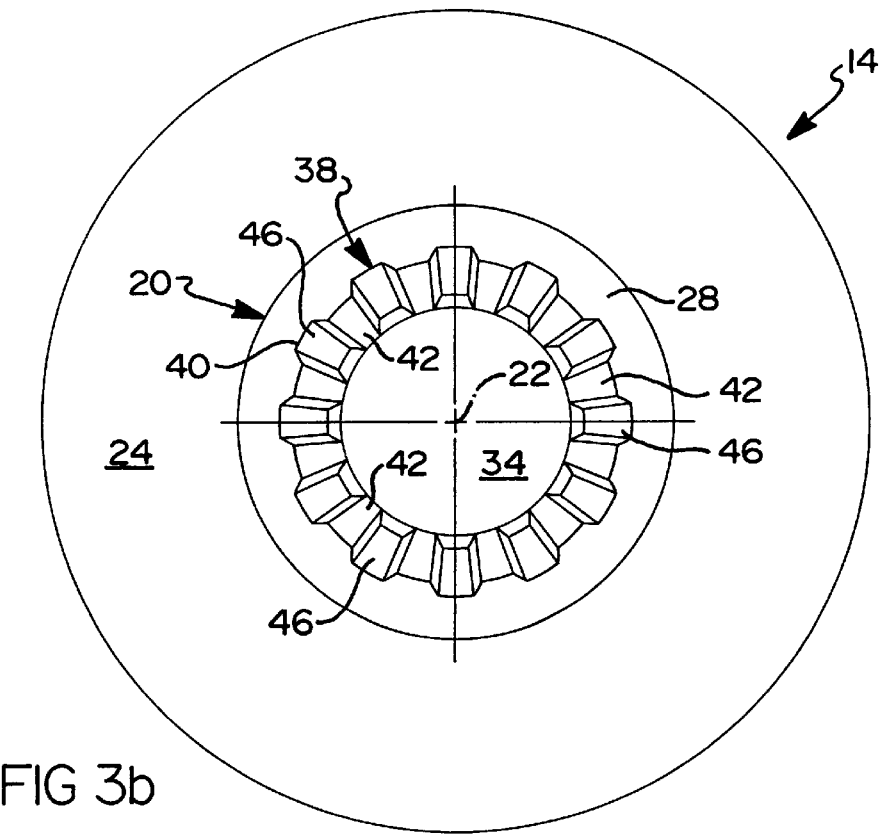
FIG. 3b is an end view of the flange shown in FIG. 2 with the shaft removed to more clearly illustrate the single taper mechanical interlock flange configuration.

As most clearly shown in FIGS. 3a and 3b, an embodiment of flange 14 includes a body 20 formed concentrically about a longitudinal axis 22 and an annular ring 24 integral with and extending radially from body 20. Body 20 includes a wheel centering hub 26 interconnecting an outer annular surface 28 to annular ring 24 and a tail 30 interconnecting an inner annular surface 32 to annular ring 24. A bore 34 extends between inner and outer annular surfaces 28 and 32, respectively, and defines a tapered interlock portion 36 and a straight portion 35. Straight portion 35 is preferably a cylindrically shaped opening having a diameter 37 slightly larger than shaft 12. In the single tapered flange configuration shown in FIGS. 2, 3a, and 3b, tapered portion 36 defines a conical surface 40 that extends from straight portion 35 toward outer annular surface 28 at an angle that diverges from longitudinal axis 22. In the embodiment shown in FIG. 3a, the angle of divergence 39 of conical surface 40 is approximately twelve degrees (12°). However, those skilled in the art will appreciate that the magnitude of angle of divergence 39 is dependent upon a variety of factors including but not limited to the release angle necessary for forging, the specific configuration of the mechanical interlock arrangement defined in tapered portion 36, and the loads to which axle 10 will be subjected during operation.

Figure 7:
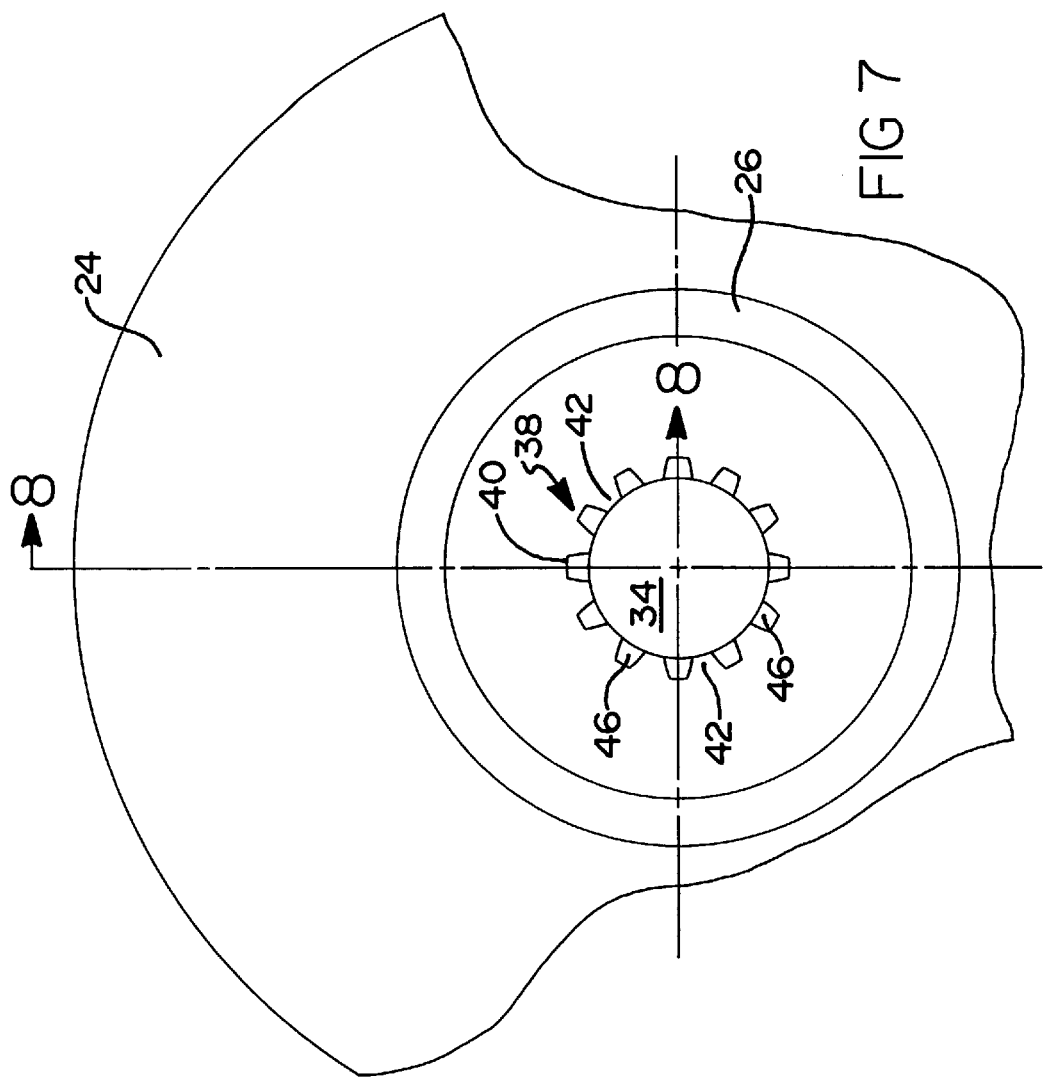
FIG. 7 is a partial end view of a flange having a twelve-tooth spline mechanical interlock arrangement on each of double opposed tapers.
Figure 8:
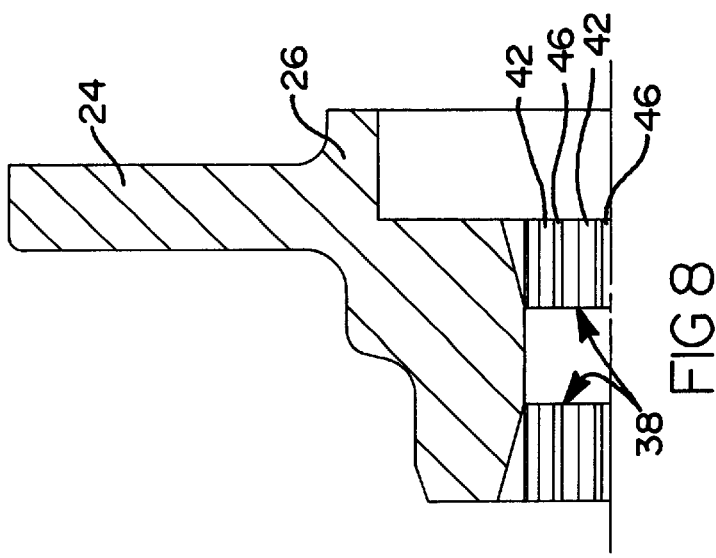
FIG. 8 is a sectional view taken along the line 8—8 of FIG. 7.
Figure 9:
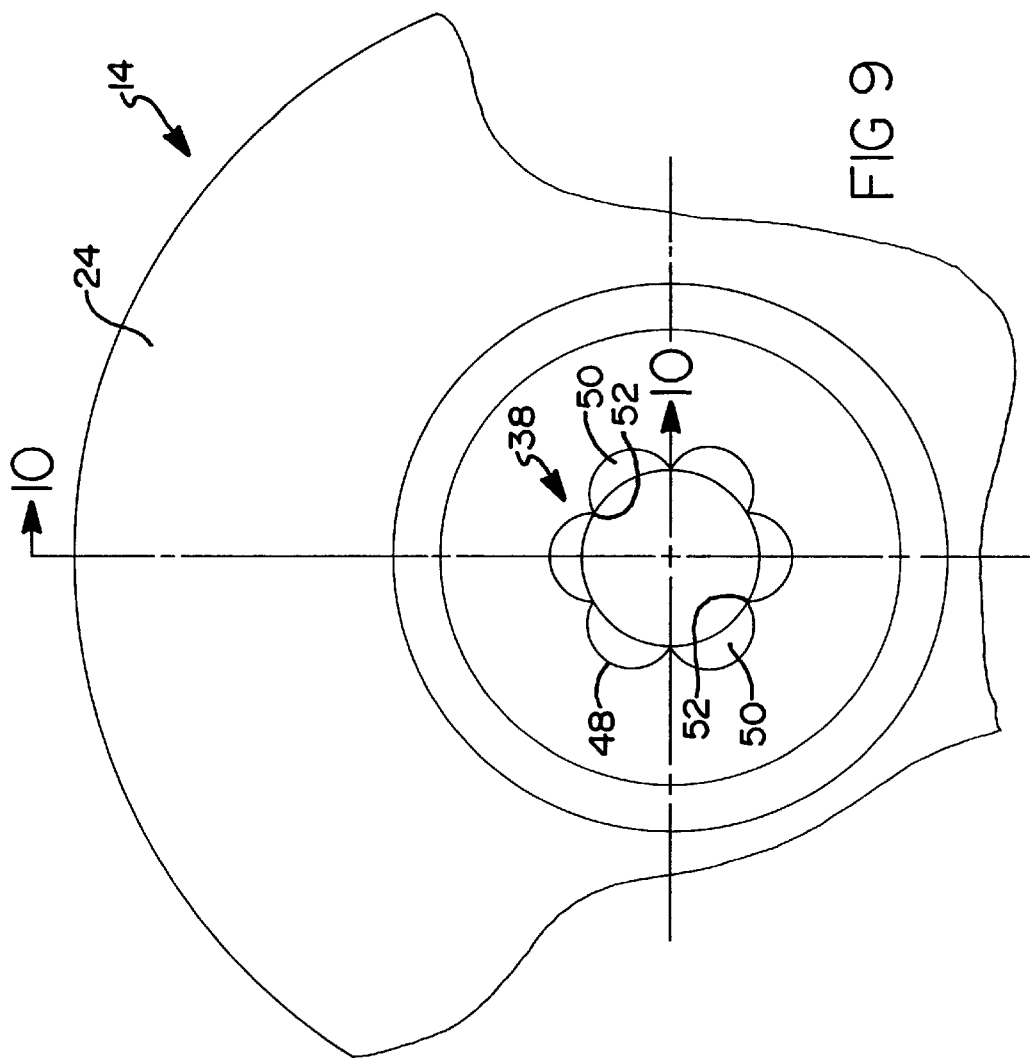
FIG. 9 is a partial end view of a flange having a six-lobe mechanical interlock arrangement on each of double opposed tapers.
Figure 10:
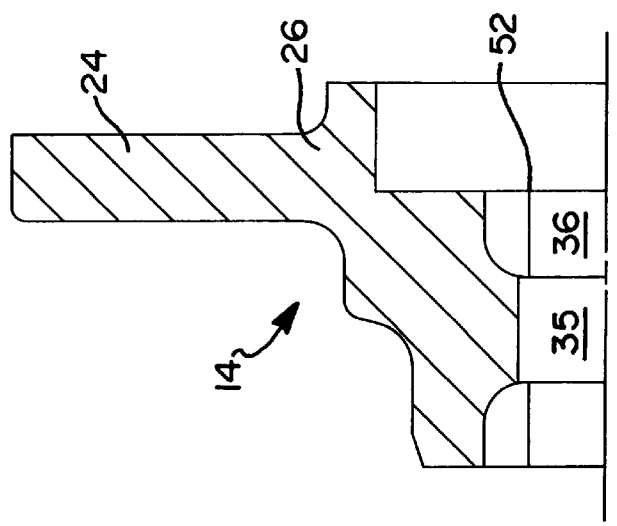
FIG. 10 is a partial sectional view taken along the line 10—10 of FIG. 9.
Figure 11:
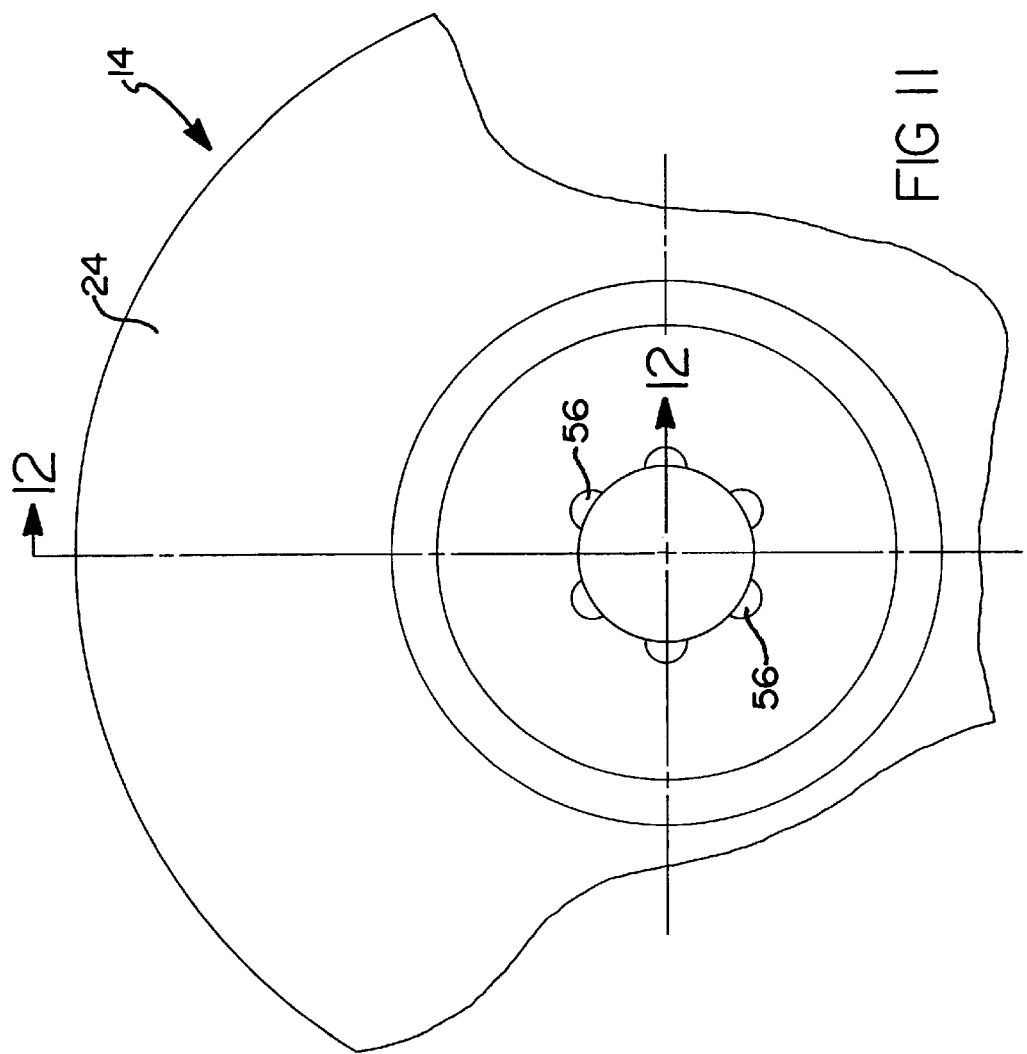
FIG. 11 is a partial end view of a flange having double opposed tapers with a herringbone mechanical interlock arrangement on each taper.
Figure 12:
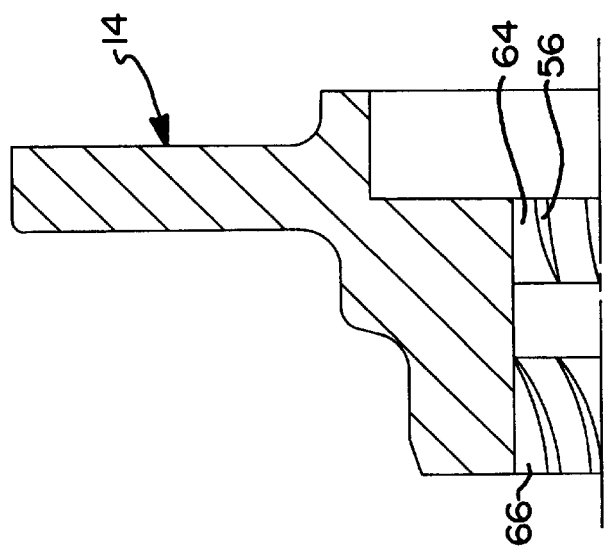
FIG. 12 is a sectional view taken along the line 12—12 of FIG. 11.

A mechanical interlock arrangement 38 is provided on conical surface 40 of tapered portion 36 to enhance the torque carrying capacity of the flange/shaft coupling. A variety of mechanical interlock configurations may be used without departing from the scope of the invention as defined by the appended claims. Examples of representative mechanical interlock arrangements include a twelve-toothed tapered spline arrangement (FIGS. 3b, 7, and 8), a six-lobe mechanical interlock (FIGS. 9 and 10), and a herringbone interlock configuration (FIGS. 11 and 12). More particularly, FIGS. 3a, 7, and 8 illustrate a mechanical interlock arrangement 38 along tapered portion 36 that includes twelve tapered splines 42 formed integral with and extending radially inwardly from conical surface 40 to define alternating cavities 46 and splines 42 (FIG. 7). Those skilled in the art will appreciate that splines 42 are formed integral with wheel centering hub 26 during the forging of flange 14, that cavities 46 are configured to accommodate the material from shaft 12 that is upset during forging as hereinafter described, and that mechanical interlock arrangement 38 couples flange 14 for rotation with shaft 12 while tapered portion 36 acts in conjunction with stop 86 (FIG. 2) to prevent axial movement of flange 14 along shaft 12.

As mentioned above, FIGS. 9 and 10 illustrate an alternative mechanical interlock arrangement 38 including a six-lobe mechanical interlock on tapered portion 36. Each lobe 48 of the six-lobe arrangement defines a cavity 50 and an interlocking surface 52 for engaging shaft 12.

An example of mechanical interlock arrangement is illustrated in FIGS. 11 and 12 to include a flange 14 having tapered bore 36 with double opposed tapers 64 and 66 wherein the mechanical interlock elements include tapered cavities 56 disposed on the respective tapers 64 and 66 in a herringbone configuration. This herringbone configuration provides a means of potentially increasing the torsional strength of the shaft and flange interface as well as the axle's resistance to fatigue. More particularly, the oppositely angled cavities on opposed tapers 64 and 66, characteristic of a herringbone pattern, act to center flange 14 under load and resist relative rotation of the flange in either direction relative to shaft 12.

Those skilled in the art will appreciate that the geometric configuration as well as the size of the mechanical interlock elements dictate in part the torsional strength of the forged connection between flange 14 and shaft 12. The tapered splines, herringbone, and six-lobe mechanical interlock arrangements are provided to illustrate a variety of interlock configurations available to accommodate the design parameters of a particular axle application. Those skilled in the art will appreciate from this description the general advantages and disadvantages of each configuration. For example, one design consideration pertains to the observation that large rounded cavities such as those of the six-lobe configuration are more easily and fully filled with upset shaft material than are the sharper edges of the tapered splines of FIGS. 3, 7, and 8 or the herringbone splines of FIGS. 11 and 12. However, the smaller splines allow for more numerous flange/shaft interengagement.

Further design flexibility is provided in the present invention by allowing selection of a flange having single or double opposed tapers of either linear or compound curvature. In general, double opposed tapers provide greater surface area at the shaft/flange interface as well as a greater number of mechanical interlocks therebetween so as to potentially increase the torque carrying capacity of the axle by increasing the strength of the interface. An increased surface area is also available through the use of compound curvature tapers rather than the linear, conical taper described above. Specifically, FIG. 4 illustrates that the tapered portion 36 of flange 14 may include a convex compound taper 62. When compared to the linear taper illustrated in FIGS. 2 and 3a, compound taper 62 produces a greater surface area for loading the mechanical interlock between flange 14 and shaft 12. Those skilled in the art will appreciate that the increased surface area increases the torque carrying capacity of the interface.

A further embodiment of flange 14 is shown in FIGS. 5 and 6 to include double opposed tapers 64 and 66 separated by an annular nib 68 similar in size and function to straight portion 35 of bore 34 (FIG. 3). Tapers 64 and 66 diverge from nib 68 and extend to inner annular surface 32 and a punch accommodating recess 70 extending longitudinally inwardly from outer annular face 28. The above described mechanical interlock arrangements 38 may be included along linear or compound curvature tapered surfaces of the opposed tapers 64 and 66. Accordingly, while tapers 64 and 66 are illustrated to define straight surfaces 72 and to include splines 73, those skilled in the art will appreciate that surfaces with curvature and alternative interlocking features may also be used.

The strength of the forged connection between the flange and the shaft both with respect to transferring torsional forces from the flange to the shaft as well as resistance to fatigue is dependent upon many variables including the surface area of the interface, the configuration of the mechanical interlock arrangement, and the tensile and compressive forces interacting between flange 14 and shaft 12 as hereinafter described. More particularly, it is anticipated that the surface area defined by the interface between flange 14 and shaft 12 increases with a larger diameter shaft and enlarged bore 34, use of double tapered configurations rather than a single taper, use of a convex curved or compound taper as shown in FIGS. 4–6 rather than the linear conical taper shown in FIGS. 2, 3*a*, 7, and 8. Moreover, the strength also varies based upon the geometry of the mechanical interlock arrangement 38. Those skilled in the art will appreciate that each of these variables may be modified in order to satisfy the design requirement for any specific axle shaft application.

With reference to FIG. 2, the forged connection between shaft 12 and flange 14 is created by deforming shaft 12 with a forging punch. Specifically, shaft 12 is inserted through straight portion 35 of bore 34 (FIG. 3*a*) and forged by the punch (not shown) that is configured to form a forged surface 74 including a drive lug 76. Drive lug 76 is formed in shaft 12 to cooperate with drive means (not shown) in machining apparatuses known in the art and may vary according to the specific machine apparatus used to finish machine axle 10 without departing from the scope of the invention as defined by the appended claims.

During forging of shaft 12 to flange 14, axial loading of shaft 12 causes shaft material to be radially upset to fill the cavities in the mechanical interlock apparatus 38 (FIG. 3*a*). A variety of methods known in the art may be used to upset shaft 12. For example, the tooling for single action press 78 having a punch 80 and a sliding die 82 shown in FIG. 13 may be used to create the single taper shown in FIG. 2. Also, the upset apparatus 88 shown in FIG. 14 may be used to create double opposed flanges. Notwithstanding the disclosure of these specific tooling assemblies, it is contemplated that a split round die, sliding die, or other containment assemblies known in the art may be used to upset shaft 12.

Figure 13:
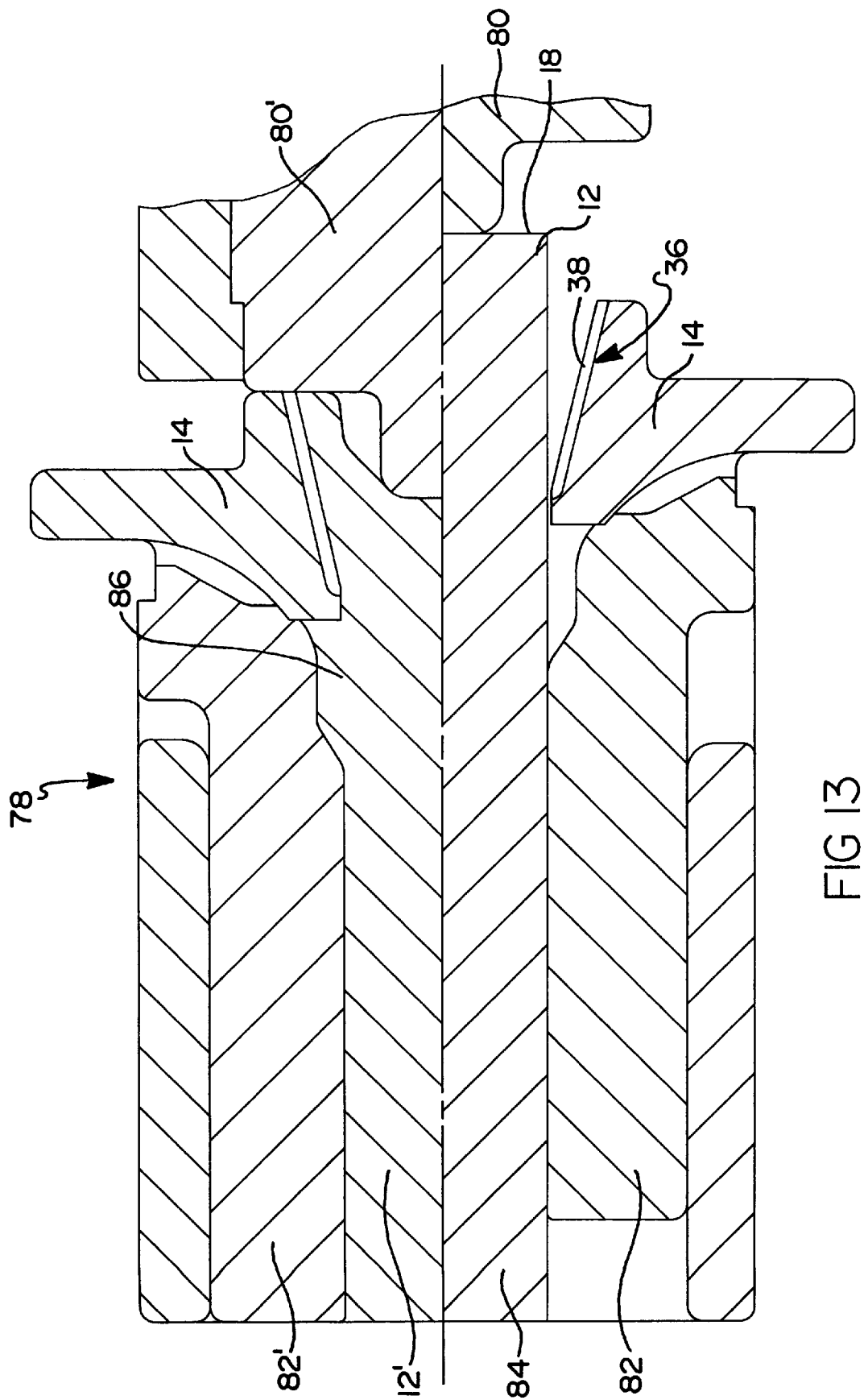
FIG. 13 is a cross sectional view of tooling for a single action press for forging a shaft to a flange having a single straight tapered mechanical interlock arrangement shown in FIGS. 2 and 3.

More specifically, the lower half of FIG. 13 illustrates the relative positions of shaft 12, flange 14, punch 80, and die 82 prior to axial loading and deformation of shaft 12. The upper half of FIG. 13 illustrates the relative positions of shaft 12', flange 14', punch 80', and die 82' after deformation of the shaft. As shown, first end 18 of shaft 12 is axially loaded by punch 80 while die 82 accommodates the body portion 84 of shaft 12. Under the axial loading, shaft 12 radially expands and material proximate to first end 18 flows into the mechanical interlock arrangement 38 in taper 36 and particularly within cavities 46 (FIGS. 3*a* and 3*b*) so as to form a positive mechanical interlock between shaft 12 and flange 14. Additionally, in the single taper flange configuration shown in FIG. 13, die 82 and 82' includes an arcuate surface that accommodates upset shaft material to form a stop 86 (FIGS. 2 and 13) preventing axial movement of flange 14' along shaft 12.

It is contemplated that in certain applications of the present invention, it will be desirable to heat shaft 12 prior to the forging operation in order to increase the formability of, and material flow from, shaft 12. Those skilled in the art will appreciate that the advantages provided by heating shaft 12 will be most desirable when small cavities are included in mechanical interlock arrangement 38. Additionally, as is described in detail below, the present invention specifically contemplates using various combinations of flange and shaft temperatures to enhance the fit of the mechanical interlock between the shaft and the flange by capitalizing on material shrinkage resulting from cooling.

Figure 14:
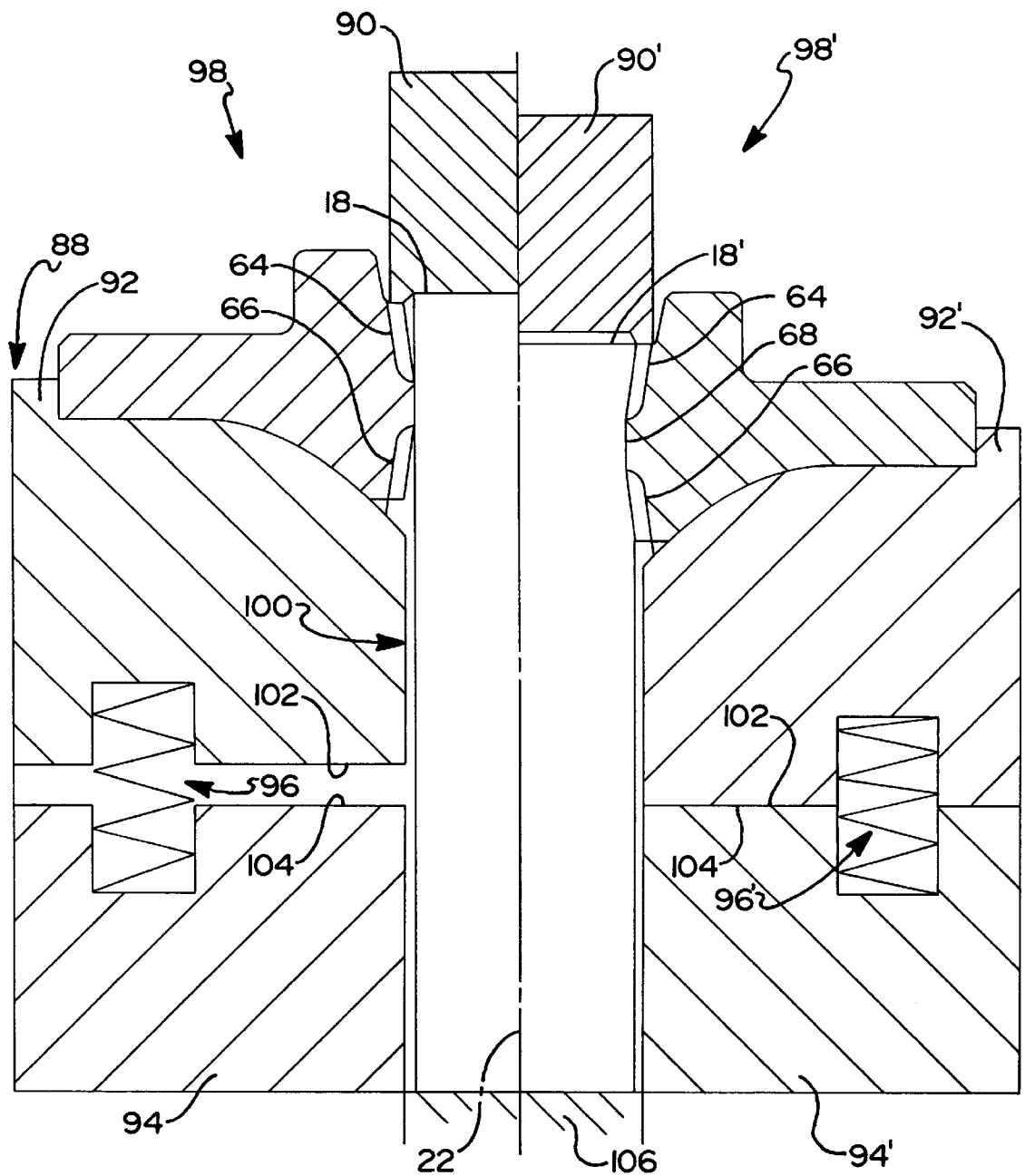
FIG. 14 is a sectional view of a sliding die assembly for forging an axle shaft to a flange having the double opposed taper configurations shown in FIGS. 5 and 6.

In a manner similar to FIG. 13, FIG. 14 illustrates an upset apparatus 88 for double opposed tapered flanges. Specifically, the portion to the left of axis 22 illustrates the upset apparatus 88 and shaft 12 in an initial upset stage 98 while the portion 98' of FIG. 14 to the right of axis 22 illustrates upset apparatus 88 at the bottom of its forging stroke where shaft 12' is fully upset. Upset apparatus 88 is configured to deform shaft 12 for mechanical interlock with A flange 14 having double opposed tapers 64 and 66 . Upset apparatus 88 includes a punch 90, 90', a nest 92, 92', nest holder 94, 94', and a spring set 96, 96' biasing nest 92 and flange 14 a calculated amount above nest holder 94 to provide for proper distribution of volume of the deformed shaft section on either side of nib 68.

In operation, punch 90 is lowered to contact, axially compress, and radially upset shaft material proximate to first shaft end 18, 18'. The upset shaft material initially fills top tapered portion 64 thereby urging nest 92 axially downward toward nest holder 94 and against the biasing force of spring set 96. The movement of nest 92 toward nest holder 94 has the effect of feeding shaft material into lower tapered sections 66 as well as a nest bore 100 defined by nest 92 and nest holder 94. The upsetting of shaft 12 continues until the bottom surface 102 of nest 92' contacts the upper surface 104 of nest holder 94' thereby defining the bottom of the forging stroke. An end stop 106 creates axial reactive forces that prevent axial movement of shaft 12 relative to nest holder 94.

The present invention allows augmentation of the fit of the flange/shaft coupling by selectively heating the shaft and/or flange. Heating of the shaft and/or flange by induction or other means common to the forging industry increases the plasticity of the material and further locks the shaft and flange together as the respective materials shrink in size when cooled. The material shrinkage maintains the two sections in tight contact throughout the cooling process to produce an assembled axle having little or no perceptible play.

For example, in hot forging, the shaft is heated prior to forging thereby increasing the diameter and axial length of the shaft. After forming, the shaft cools causing it to shrink both axially and radially. Those skilled in the art should appreciate that the relative axial and radial lengths of the heated shaft are selected to cause the shaft's axial shrinkage to exceed its reduction in diameter. Accordingly, as the shaft cools, the upset material bearing upon the tapers or annular faces of the flange expand the flange thereby maintaining a tight fit of the flange/shaft coupling.

It is contemplated that the relative temperatures of the shaft and flange may be selected from a variety of hot, warm, and cold forging techniques according to the specific application and design criteria for the axle. For example, as the flange is heated, the diameter and length of bore 34 will increase. Conversely, as the flange is cooled, the size of bore 34 will shrink thereby radially and axially compressing the upset material from the shaft that engages bore 34 and particularly the tapered surfaces thereof. This compressive force provides resistance to relative rotational movement of shaft 12 and flange 14 in addition to enhancing the mechanical interlock provided by mechanical interlock arrangement 38.

In various axle applications, it may be undesirable to heat the shaft or flange due, for example, to the materials from which these components are manufactured. In these instances, the shaft may be cold forged to the flange. In cold forging, neither the flange nor the shaft are heated prior to upsetting the shaft. As a result, the upset material flows less freely into the mechanical interlock arrangement with little or no shrinkage occurring after forging. Accordingly, during forging, the deformation of the shaft creates a force urging the flange radially outwardly thereby placing the flange in tension. The elasticity of the flange compresses the shaft so as to increase the interlock and frictional forces between the flange and shaft.

It is contemplated that, based upon the foregoing explanation, those skilled in the art will be able to balance the benefits and disadvantages provided by the particular relative temperatures of the shaft and the flange to select the forging technique best suited for a particular axle application. Various other relative shaft and flange temperature applications are available. For example, the shaft or flange temperature may be increased to less than eighteen hundred degrees fahrenheit (1800° F.) prior to upsetting for a shaft and flange formed of 1040 steel. The resulting warm forging technique limits shrinkage during cooling while moderately increasing material flow during upsetting.

While the many variables impacting the strength and formability of the connection between shaft 12 an flange 14 are discussed above, FIGS. 15a–15c illustrate that various alternatives are also available for providing seal and bearing surfaces 108 and 110, respectively, commonly required in vehicle axles. The seal and bearing surfaces of axle 10 are generally machined into the axle following forging. In the axle shown in FIG. 15a, line 112 illustrates the forged interface between flange 14 and shaft 12. Similarly, dashed lines 114 designate machining surfaces for creating bearing surface 110 and seal surface 108 from the shaft material. FIGS. 15a–15c also each illustrate that the flange 14 of axle 10 is generally machined along line 116 following forging.

Alternatively, as shown in FIG. 15b, tail 30 of flange 14 is elongated to extend longitudinally along shaft 12. In this arrangement, cylindrical seal surface 108 is machined from flange 14 whereas cylindrical bearing surface 110 is machined from the upset material of shaft 12. Finally, the interface line 112 in FIG. 15c illustrates that the shaft 12 includes the bearing and seal surfaces 110 and 108, respectively, as well as the wheel centering hub 26.

In view of this description as well as the appended drawings and claims, those skilled in the art will appreciate that the present invention provides a forged taperlock axle having a forged connection between the flange and shaft. Among the advantages provided by this invention is that the shaft and flange may be separately formed thereby optimally addressing the manufacturing concerns for each component. The separate flange and shaft components are coupled to one another via the tapered mechanical interlock arrangement as well as the tensile and compressive forces generated due to differential contraction during cooling of heated elements. Those skilled in the art may vary the many variables impacting the strength, fit, and formability of the forged connection in order to specifically tailor the apparatus and method claimed herein for application in a variety of axle applications.

The foregoing discussion discloses and describes merely exemplary embodiments of the present invention. One skilled in the art will readily recognize from such description, and from the accompanying drawings and claims, that various changes, modifications, and variations can be made therein without departing from the spirit and scope of the invention as described in the following claims.

What is claimed is:

1. A flange connectable to a shaft to form an axle, said flange comprising:

a hub formed concentric about a longitudinal axis, said hub including a first annular face, a second annular face, and a bore extending between said first and second annular faces to accommodate a shaft insertable into said bore from said first annular face toward said second annular face, said bore including a cylindrical surface formed therein and a first tapered surface extending from said cylindrical surface toward said second annular face and diverging from said longitudinal axis;

locking means integral with said tapered surface for mechanically coupling said flange for rotation with a shaft; and an annular ring coaxial and integral with said hub.

2. The flange of claim 1 wherein said first locking means includes a plurality of teeth extending from said first tapered surface.

3. The flange of claim 1 wherein said cylindrical surface interconnects said first annular face and said first tapered surface.

4. The flange of claim 1 wherein said first tapered surface includes a conical surface linearly diverging from said longitudinal axis.

5. The flange of claim 1 wherein said first tapered surface is convex relative to said longitudinal axis.

6. The flange of claim 1 wherein said bore further defines a second tapered surface diverging from said longitudinal axis and wherein said flange further includes second locking means integral with said second tapered surface for mechanically coupling said flange for rotation with a shaft.

7. The flange of claim 6 wherein said bore includes a cylindrical surface interconnecting said first tapered surface and said second tapered surface.

8. The flange of claim 1 wherein said hub includes a tail defining said second annular face and a cylindrical bearing surface.

9. A two-piece axle comprising:

a flange including a longitudinal axis, a first annular face, a second annular face, and a bore extending between said first and second annular faces, said bore including a cylindrical surface formed therein and a first taper portion extending from said cylindrical surface toward said second annular face to define a first tapered surface diverging from said longitudinal axis, said flange including first locking means integral with said first tapered surface for mechanically coupling said flange for rotation with a shaft;

a shaft having a free end disposed in said bore and a first radial upset tapered to converge toward said shaft from said free end and engaging said first locking means to couple said flange to said shaft for rotation therewith.

10. The axle of claim 9 wherein said first interlocking means includes alternating teeth and cavities and wherein said first radial upset fills a portion of said cavities and engages said teeth.

11. The axle of claim 9 wherein said first end portion of said shaft includes a second radial upset engaging said first annular face to prevent axial movement of said flange along said shaft.

12. The axle of claim 9 wherein said bore includes a second taper portion defining a second tapered surface diverging from said longitudinal axis, wherein said flange further includes second locking means integral with said second tapered surface for mechanically coupling said flange for rotation with said shaft, and wherein said shaft further includes a second radial upset engaging said second locking means to couple said flange to said shaft for rotation therewith.

13. The axle of claim 9 wherein said shaft urges said flange radially outward thereby placing said flange in tension.

14. The axle of claim 9 wherein said flange urges said shaft radially inward thereby placing shaft in compression.

15. A flange connectable to a shaft to form an axle, said flange comprising:

a hub formed concentric about a longitudinal axis, said hub including a first annular face, a second annular face, and a bore extending between said first and second annular faces, said bore including a first tapered surface diverging from said longitudinal axis and a second tapered surface diverging from said longitudinal axis;

first locking means integral with said first tapered surface and adapted to mechanically couple said flange for rotation with a shaft;

second locking means integral with said second tapered surface and adapted to mechanically couple said flange for rotation with a shaft; and an annular ring coaxial and integral with said hub.

16. The flange of claim 15 wherein said bore includes a cylindrical surface interconnecting said first tapered surface and said second tapered surface.

17. The flange of claim 15 wherein said hub includes a tail defining said second annular face and a cylindrical bearing surface.

18. The flange of claim 15 wherein said first locking means includes a plurality of teeth extending from said first tapered surface and said second locking means includes a plurality of teeth extending from said second tapered surface.

19. A two-piece axle comprising:

a flange including a longitudinal axis, a first annular face, a second annular face, and a bore extending between said first and second annular faces, said bore including a locking surface having first and second locking members integral with said locking surface for mechanically coupling said flange for rotation with a shaft, said first locking member having a first slope, said second locking member having a second slope, said first slope being in a direction opposite said second slope; and a cylindrical shaft disposed in said bore, said shaft including a first end portion having a first radial upset engaging said first locking member and a second radial upset engaging said second locking member to couple said flange to said shaft for rotation therewith and to prevent axial movement of said flange along said shaft.

20. The axle of claim 19 wherein said first and second locking members include cavities extending radially outward relative to said longitudinal axis from said locking surface, said first and second radial upsets disposed in said cavities.

21. The axle of claim 19 wherein said locking surface includes a first taper portion defining a first tapered surface diverging from said longitudinal axis, said first locking member integral with said first tapered surface.

22. The axle of claim 21 wherein said locking surface includes a second taper portion defining a second tapered surface diverging from said longitudinal axis, said second locking member integral with said second tapered surface.

23. The axle of claim 19 wherein said first and second slopes are each non-linear.

24. A flange connectable to a shaft to form an axle, said flange comprising:

a hub having a first annular face, a second annular face, and a bore extending between said first and second annular faces, said bore including a first tapered surface diverging at a compound curvature from said longitudinal axis; and locking means integral with said tapered surface for mechanically coupling said flange for rotation with a shaft.

25. The flange of claim 24 wherein said first locking means includes a plurality of teeth extending from said first tapered surface.

26. The flange of claim 25 wherein said first tapered surface is convex relative to said longitudinal axis.

* * * * *